United States Patent

Hirai et al.

[11] Patent Number: 6,081,773
[45] Date of Patent: Jun. 27, 2000

[54] TRANSLATION APPARATUS AND STORAGE MEDIUM THEREFOR

[75] Inventors: Tokuyuki Hirai; Naoko Shinozaki, both of Nara; Kazuo Nishiura, Yamatokoriyama; Ichiko Sata, Nara, all of Japan

[73] Assignee: Sharp Kabushiki Kaisha, Osaka, Japan

[21] Appl. No.: 09/098,509

[22] Filed: Jun. 17, 1998

[30] Foreign Application Priority Data

Sep. 3, 1997 [JP] Japan .................................. 9-238539

[51] Int. Cl.[7] ............................. G06F 17/28; G06F 17/21
[52] U.S. Cl. ...................... 704/3; 704/6; 704/8; 707/536
[58] Field of Search .................. 704/3, 6, 7, 8, 704/2, 1, 277; 707/536, 530, 531, 535; 709/204, 206, 207, 227; 345/326, 330, 333, 334, 171; 382/100, 171; 379/88.05, 88.06

[56] References Cited

U.S. PATENT DOCUMENTS

| | | | |
|---|---|---|---|
| 5,175,684 | 12/1992 | Chong | 704/3 |
| 5,416,903 | 5/1995 | Malcolm | 345/333 |
| 5,497,319 | 3/1996 | Chong et al. | 704/2 |
| 5,535,120 | 7/1996 | Chong et al. | 704/3 |
| 5,701,497 | 12/1997 | Yamauchi et al. | 704/3 |
| 5,729,618 | 3/1998 | Fujisawa et al. | 382/100 |
| 5,778,350 | 7/1998 | Adams et al. | 707/1 |
| 5,796,967 | 8/1998 | Filepp et al. | 345/339 |
| 5,893,134 | 4/1999 | O'Donoghue et al. | 707/536 |

FOREIGN PATENT DOCUMENTS

| | | |
|---|---|---|
| 2208775 | 8/1990 | Japan . |
| 40-5151257A | 6/1993 | Japan . |
| 5303589 | 11/1993 | Japan . |

Primary Examiner—Joseph Thomas

[57] ABSTRACT

A translation apparatus is provided which comprises: an inputting section for inputting a source document in a natural language; a layout analyzing section for analyzing layout information including cascade information, itemization information, numbered itemization information, labeled itemization information and separator line information in the source document inputted by the inputting section and specifying a translation range on the basis of the layout information; a translation processing section for translating a source document text in the specified translation range into a second language; and an outputting section for outputting a translated text provided by the translation processing section.

19 Claims, 8 Drawing Sheets

TRANSLATION APPARATUS AND STORAGE MEDIUM THEREFOR

CROSS-REFERENCES TO RELATED APPLICATIONS

This application is related to Japanese Patent Application No. HEI 9(1997)-238539 filed on Sep. 3, 1997 whose priority is claimed under 35 USC §119, the disclosure of which is incorporated herein by reference in its entirety.

BACKGROUND OF THE INVENTION

1. Field of the Invention

The present invention relates to a translation apparatus and a storage medium storing therein a translation apparatus controlling program which are applied to word processors, personal computers, portable information processors and the like for translating an inputted source document and outputting a translation.

2. Description of the Related Arts

In recent years, a number of computer-based translation machines have been developed. However, the performance of the computer-based translation machines is not comparable to that of professional translators. One reason for this is that a source document typically contains layout information such as line feeding, cascading and itemization in addition to texts. The professional translators can readily understand the meanings of such layout information, while the translation machines cannot.

If the layout information in the source document cannot be detected, it is impossible to extract the layout information from the source document. In addition, a translation range in the source document cannot correctly be specified, resulting in mistranslation. If an itemization tag is mistakenly regarded as part of a sentence, for example, an erroneous sentence analysis may result.

As one conventional translation method utilizing layout information, Japanese Unexamined Patent Publication No. HEI 2(1990)-208775, for example, proposes a machine translation method in which non-sentence information such as itemized text portions, mathematical expressions and titles are detected through comparison with pattern matching data in a non-sentence information processing section and a translation is produced in consideration of the detected non-sentence information for improvement of translation accuracy.

Further, Japanese Unexamined Patent Publication No. HEI 5(1993)-303589 proposes a translation machine which is capable of detecting headline portions, paragraph text portions and itemized text portions as syntax patterns by layout analyzing means and utilizes different sentence generation rules depending on the syntax patterns for translation thereof.

However, the arts utilizing the layout information as disclosed in Japanese Unexamined Patent Publications No. HEI 2(1990)-208775 and HEI 5(1993)-393589 are based on the assumption that source documents are composed in a fixed format and, therefore, cannot flexibly cope with various itemization formats. Electronic mails, which have recently been prevailing, are composed in various formats. For example, in an electronic mail dialog, quotation tags are added to sentences as follows:

```
>> >> >> This is a test mail. Is there anything wrong?
>> >> I received your mail. Everything seems fine.
>> Thank you. I'm relieved. See you on Sunday!
No problem. See You!
            :
or
John : This is a test mail. Is There anything wrong?
Mary >> I received your mail. Everything seems fine.
John : Thank you. I'm relieved. See you on Sunday!
Mary >> No problem. See You!
            :
```

In other fields, various layout formats are employed for production of documents depending on producer' preferences. Although the professional translators can readily understand various layout information, the conventional translation machines are not designed to properly extract the layout information, thereby failing to correctly specify a translation range.

SUMMARY OF THE INVENTION

In view of the foregoing, the present invention is directed to a translation apparatus and a storage medium storing therein a translation apparatus controlling program which properly analyze various layout information in a source document, correctly specify a translation range, and translate a source document text in the specified translation range into another language with an improved translation accuracy.

In accordance to the present invention, there is provided a translation apparatus which includes: an inputting section for inputting a source document in a natural language; a layout analyzing section for analyzing layout information including cascade information, itemization information, numbered itemization information, labeled itemization information and separator line information in the source document inputted by the inputting section and specifying a translation range on the basis of the layout information; a translation processing section for translating a source document text in the specified translation range into a second language; and an outputting section for outputting a translated text provided by the translation processing section.

DETAILED DESCRIPTION OF THE PREFERRED EMBODIMENTS

Figure 1:
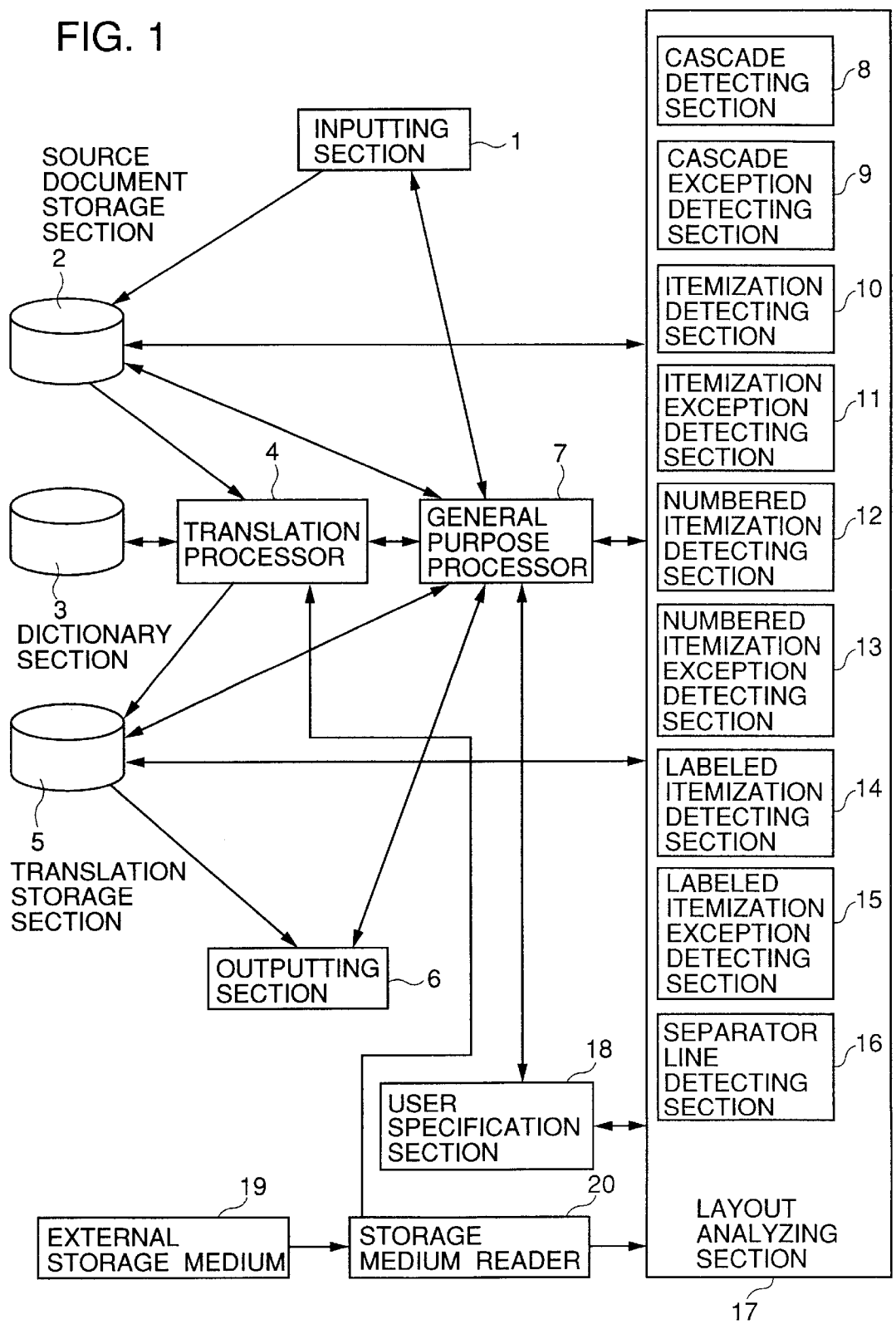
FIG. 1 is a block diagram illustrating the construction of a translation apparatus for machine translation according to one embodiment of the present invention.

A translation apparatus according to the present invention includes: an inputting section for inputting a source document in a natural language; a layout analyzing section for analyzing layout information including cascade information, itemization information, numbered itemization information, labeled itemization information and separator line information in the source document inputted by the inputting section and specifying a translation range on the basis of the layout information; a translation processing section for translating a source document text in the specified translation range into a second language; and an outputting section for outputting a translated text provided by the translation processing section.

In the present invention, the inputting section preferably includes inputting devices such as a keyboard, a mouse, a pen/tablet and a network communication device.

The layout analyzing section and the translation processing section are preferably comprised of a microprocessor including a CPU, a ROM, a RAM and I/O ports.

The ROM stores therein programs for causing the CPU to function as the layout analyzing section and the translation processing section, and also serves as a dictionary section which stores therein dictionary data. The RAM is adapted to store therein a source document to be translated and layout information.

The outputting section preferably includes a display device such as a liquid crystal display or a plasma display and a printer such as a thermal printer or a laser printer.

In accordance with the present invention, various layout information in the source document is properly analyzed, and a translation range is correctly specified. Then, a source document text in the specified translation range is translated into the second language with an improved translation accuracy.

The layout analyzing section may include a cascade detecting section for detecting a cascade format by comparing one line with the next line in the source document and, if the one line has the same leading character string of a predetermined length as the next line and the leading character string includes a plurality of symbols or space characters arranged in succession, regarding the one line as being in the cascade format, and performing a cascade processing operation by deleting the leading character string from the one line in the cascade format with the leading character string being regarded as a cascade header.

With this arrangement, the cascade information which is part of the layout information included in the source document is detected, and the translation range is more correctly specified. Therefore, the translation accuracy can be improved by taking into account the layout information for translation of the source document.

The cascade detecting section may be adapted to detect the cascade format by comparing one line with a predetermined number of subsequent lines in the source document instead of comparing the one line with the next line and, if the one line has the same leading character string of a predetermined length as any of the subsequent lines and the leading character string includes a plurality of symbols or space characters arranged in succession, regarding the one line as being in the cascade format, and perform the cascade processing operation on the assumption that a line which follows the one line and does not include the leading character string is a continuation from the one line.

The number of the subsequent lines to be compared by the cascade detecting section may be specified as a parameter by a user.

The cascade detecting section may be adapted to insert line-feeds at predetermined length intervals in the translated text and prefix the cascade header to each of the lines of the translated text.

With this arrangement, the translated text can be imparted with the cascade information. Since the lines in the translated text each have the same length, the translated text can neatly be arranged in the cascade format.

The layout analyzing section may further include a cascade exception detecting section for negating the detection of the cascade format if a predetermined character string is not included in the leading character string in the line regarded as being in the cascade format by the cascade detecting section, and preventing the cascade detecting section from performing the cascade processing operation.

With this arrangement, the line which has been regarded as being in the cascade format by the cascade detecting section but in reality is not in the cascade format can be detected and prevented from being subjected to the cascade processing operation. That is, the translation range can be specified more correctly.

In the cascade exception detecting section, the predetermined character string to be included in the leading character string may be specified as a parameter by a user.

The layout analyzing section may further include an itemization detecting section for detecting an itemization format by comparing one line with the next line in the source document and, if the one line has the same leading character string of a predetermined length as the next line and the leading character string includes a single symbol, regarding the one line as being in the itemization format, and performing an itemization processing operation by separating the leading character string from a subsequent text portion in the one line with the leading character string being regarded as an itemization header.

With this arrangement, the itemization information which is part of layout information included in the source document is detected, and the translation range is more correctly specified. Therefore, the translation accuracy can be improved by taking into account the layout information for translation of the source document.

The itemization detecting section may be adapted to detect the itemization format by comparing one line with a predetermined number of subsequent lines in the source document instead of comparing the one line with the next line and, if the one line has the same leading character string of a predetermined length as any of the subsequent lines and the leading character string includes a single symbol, regarding the one line as being in the itemization format, and perform the itemization processing operation on the assumption that a line which follows the one line and does not include the itemization header is a continuation from the one line.

The number of the subsequent lines to be compared by the itemization detecting section may be specified as a parameter by a user.

The layout analyzing section may further include an itemization exception detecting section for negating the detection of the itemization format, if a predetermined symbol is not included in the leading character string in the line regarded as being in the itemization format by the itemization detecting section, and preventing the itemization detecting section from performing the itemization processing operation.

With this arrangement, the line which has been regarded as being in the itemization format by the itemization detecting section but in reality is not in the itemization format can be detected, and prevented from being subjected to the itemization processing operation. That is, the translation range can be specified more correctly.

In the itemization exception detecting section, the predetermined symbol to be included in the leading character string may be specified as a parameter by a user.

The layout analyzing section may further include a numbered itemization detecting section for detecting a numbered itemization format by comparing one line with the next line in the source document and, if the one line and the next line respectively have leading character strings which include the same symbol and different numeric characters and numbers respectively represented by the numeric characters included in the leading character strings are in numerically ascending order, regarding the one line as being in the numbered itemization format, and performing a numbered itemization processing operation by separating the leading character string from a subsequent text portion in the one line with the leading character strings being each regarded as a numbered itemization header.

With this arrangement, the numbered itemization information which is part of layout information included in the source document is detected, and the translation range is more correctly specified. Therefore, the translation accuracy can be improved by taking into account the layout information for translation of the source document.

The numbered itemization detecting section maybe adapted to detect the numbered itemization format by comparing one line with a predetermined number of subsequent lines in the source document instead of comparing the one line with the next line and, if the one line and any of the subsequent lines respectively have leading character strings which include the same symbol and different numeric characters and numbers respectively represented by the numeric characters included in the leading character strings are in numerically ascending order, regarding the one line as being in the numbered itemization format, and perform the numbered itemization processing operation on the assumption that a line which follows the one line and does not include the numbered itemization header is a continuation from the one line.

The number of the subsequent lines to be compared by the numbered itemization detecting section may be specified as a parameter by a user.

The layout analyzing section may further include a numbered itemization exception detecting section for negating the detection of the numbered itemization format if the leading character string included in the line regarded as being in the numbered itemization format by the numbered itemization detecting section includes a plurality of numeric characters arranged in succession and the number of the numeric characters is greater than a predetermined maximum character number, and preventing the numbered itemization detecting section from performing the numbered itemization processing operation.

With this arrangement, the line which has been regarded as being in the numbered itemization format by the numbered itemization detecting section but in reality is not in the numbered itemization format can be detected and prevented from being subjected to the numbered itemization process. That is, the translation range can be specified more correctly.

In the numbered itemization exception detecting section, the maximum character number may be specified as a parameter by a user.

The numbered itemization exception detecting section may be adapted to negate the detection of the numbered itemization format if the leading character string included in the line regarded as being in the numbered itemization format by the numbered itemization detecting section does not include a predetermined symbol, and prevent the numbered itemization detecting section from performing the numbered itemization processing operation.

In the numbered itemization exception detecting section, the predetermined symbol to be included in the leading character string may be specified as a parameter by a user.

The numbered itemization detecting section may be designed so that, if the numbers respectively represented by the numeric characters in the leading character strings are not in numerically ascending order, a user is permitted to determine whether or not the one line should be regarded as being in the numbered itemization format.

The layout analyzing section may further include an alphabetized itemization detecting section and an alphabetized itemization exception detecting section, which are arranged in substantially the same manner as the numbered itemization detecting section and the numbered itemization exception detecting section, except that detection of an alphabetized itemization format is achieved by checking if lines in the source document respectively have leading character strings which include the same symbol and different alphabets and if the alphabets respectively included in the leading character strings are in alphabetically ascending order.

The layout analyzing section may further include a labeled itemization detecting section for detecting a labeled itemization format by checking two successive lines in the source document for detection of a predetermined labeled itemization separator and, if the labeled itemization separator is detected in the two successive lines, regarding the two successive lines as being in the labeled itemization format, and performing a labeled itemization processing operation by separating a leading character string having the labeled itemization separator at its end from a subsequent text portion in each of the lines with the leading character string being regarded as a labeled itemization header.

With this arrangement, labeled itemization information which is part of layout information included in the source document is detected, and the translation range is more correctly specified. Therefore, the translation accuracy can be improved by taking into account the layout information for translation of the source document.

The labeled itemization detecting section may be adapted to detect the labeled itemization format by checking a predetermined number of successive lines in the source document for detection of the labeled itemization separator instead of checking the two successive lines and, if the labeled itemization separator is detected in the first line and any other line of the successive lines, regarding at least the lines including the labeled itemization separator as being in the labeled itemization format, and perform the labeled itemization processing operation on the assumption that a line which follows the first line and does not include the labeled itemization separator is a continuation from the first line.

The number of the successive lines to be checked by the labeled itemization detecting section may be specified as a parameter by a user.

The labeled itemization separator to be detected by the labeled itemization detecting section may be a colon (:).

The labeled itemization separator to be detected by the labeled itemization detecting section may be specified by a user.

The layout analyzing section may further include a labeled itemization exception detecting section for negating the detection of the labeled itemization format if a predetermined labeled itemization exception character string followed by the labeled itemization separator is included in the labeled itemization headers in the lines regarded as being in the labeled itemization format by the labeled itemization detecting section, and preventing the labeled itemization detecting section from performing the labeled itemization processing operation.

With this arrangement, the lines which have been regarded as being in the labeled itemization format by the labeled itemization detecting section but in reality are not in the labeled itemization format are not subjected to the labeled itemization process. That is, the translation range can be specified more correctly.

The labeled itemization exception character string may be "TEL" or "FAX".

In the labeled itemization exception detecting section, the labeled itemization exception character string may be specified by a user.

The layout analyzing section may further include a separator line detecting section for detecting an independent separator line by sequentially checking characters in a line in the source document and, if the line includes a sequence of identical characters of a number not smaller than a predetermined number, regarding the line as the separator line.

With this arrangement, separator line information which is part of layout information included in the source document is detected, and the translation range is more correctly specified. Therefore, the translation accuracy can be improved by taking into account the layout information for translation of the source document.

In the separator line detecting section, the predetermined number for the sequence of the characters may be specified as a parameter by a user.

The separator line detecting section may be adapted to detect the independent separator line by sequentially checking characters in a line in the source document and, if the line includes a sequence of symbols of a number not smaller than a predetermined number, regarding the line as the separator line.

In the separator line detecting section, the predetermined number for the sequence of the symbols may be specified as a parameter by a user.

The present invention will hereinafter be described in detail by way of embodiments thereof with reference to the attached drawings. It should be understood that the invention is not limited to these embodiments.

FIG. 1 is a block diagram illustrating the construction of a translation apparatus for machine translation according to one embodiment of the present invention. Referring to FIG. 1, an inputting section 1 for inputting a source document and user instructions is comprised of inputting devices such as a keyboard, a mouse and a pen/tablet, and a network communication device.

A source document storage section 2 for storing therein a source document to be translated and inputted from the inputting section 1 is comprised of memories such as a RAM, a floppy disk and a hard disk.

A dictionary section 3 for storing therein dictionary data to be utilized for a translation process is comprised of nonvolatile memories such as a ROM, a floppy disk and a hard disk.

A translation processor 4 for subjecting the source document inputted from the inputting section 1 to the translation process with the use of the data stored in the dictionary section 3 is comprised of a microprocessor including a CPU, a ROM, a RAM and I/O ports.

A translation storage section 5 for storing therein a translation provided by the translation processor 4 is comprised of memories such as a RAM, a floppy disk and a hard disk.

An outputting section 6 is comprised of a display device such as a liquid crystal display or a plasma display and a printer such as a thermal printer or a laser printer, and adapted to output the source document stored in the source document storage section 2 and the translation stored in the translation storage section 5 on the display device and the printer.

A general-purpose processor 7 for performing general operations such as comparison of character strings and numeric values and control operations is comprised of a microprocessor including a CPU, a ROM, a RAM and I/O ports.

A layout analyzing section 17 according to the present invention is comprised of a microprocessor including a CPU, a ROM, a RAM and I/O ports.

A user specification section 18 allows a user to specify parameters for layout information. The inputting device including a keyboard, a mouse and a pen/tablet serves as the user specification section 18.

Stored in the ROM in the layout analyzing section 17 is a program which causes the microprocessor to function as a cascade detecting section 8 for detecting a cascade format and performing a cascade processing operation, a cascade exception detecting section 9 for detecting a cascade exception, negating the detection of the cascade format and inhibiting the cascade processing operation from being performed, an itemization detecting section 10 for detecting an itemization format and performing an itemization processing operation, an itemization exception detecting section 11 for detecting an itemization exception, negating the detection of the itemization format and inhibiting the itemization processing operation from being performed, a numbered itemization detecting section 12 for detecting a numbered itemization format and performing a numbered itemization processing operation, a numbered itemization exception detecting section 13 for detecting a numbered itemization exception, negating the detection of the numbered itemization format and inhibiting the numbered itemization processing operation from being performed, a labeled itemization detecting section 14 for detecting a labeled itemization format and performing a labeled itemization processing operation, a labeled itemization exception detecting section 15 for detecting a labeled itemization exception, negating the detection of the labeled itemization format and inhibiting the labeled itemization processing operation from being performed, and a separator line detecting section 16 for detecting a separator line and performing a separator line processing operation.

An external storage medium 19 is comprised of a CD-ROM, a floppy disk (FD) or the like.

A storage medium reader 20 functions as a program inputting section which installs a program of the present invention from the external storage medium 19 into the RAMs of the translation processor 4 and the layout analyzing section 17 in an executable manner.

In accordance with the present invention, the storage medium 19 stores a control program for controlling the interpreter by means of a computer. In conformity with the control program, the computer causes the layout analyzing section 17 to analyze layout information including cascade information, itemization information, numbered itemization information, labeled itemization information and separator line information in the source document in a natural language inputted by the inputting section and to specify a translation range, causes the translation processor 4 to translate a source document text in the specified translation range into a second language, and causes the outputting section 6 to output a translation provided by the translation processor 4.

There will hereinafter be described a translation process to be performed by the interpreter for machine translation shown in FIG. 1. The following embodiments pertain to the analysis of Japanese source document, but the present invention is not limited thereto.

An explanation will be given to operations to be performed by the cascade detecting section 8 and the cascade exception detecting section 9 in accordance with Embodiments 1 to 6 of the present invention.

The following is an exemplary source document in the cascade format (where symbol ">>" is a cascade header):

```
>> A new generation CPU which speeds up a multimedia
>> processing operation, a 32MB memory and a 1.6GB HDD
>> are incorporated, offering advantages in high speed
>> processing and high capacity data processing which
>> are required for multimedia and business
>> applications
or
>> A new generation CPU which speeds up a multimedia
processing operation, a 32MB memory and a 1.6GB HDD
>> are incorporated, offering advantages in high speed
>> processing and high capacity data processing which
>> are required for multimedia and business
>> applications.
```

In accordance with Embodiment 1, the source document inputted to the source document storage section 2 from the inputting section 1 is subjected to a cascade detecting operation for detection of the cascade format by the cascade detecting section 8 in the layout analyzing section 17 before the source document is sent to the translation processor 4.

In the cascade detecting operation performed by the cascade detecting section 8, one line in the source document stored in the source document storage section 2 is compared with the next line. The comparison of the lines is carried out by the general purpose processor 7. If the one line has the same leading character string consisting of $N_2$ (>0) characters as the next line and the leading character string includes a plurality of symbols or space characters arranged in succession, the one line is regarded as being in the cascade format.

The cascade detecting operation, which is performed in the same manner by the cascade detecting section 8 in Embodiments 1 to 6, will be described later with reference to flow charts shown in FIGS. 2 and 3.

If the cascade format is detected by the cascade detecting section 8, the layout analyzing section 17 causes the source document storage section 2 to delete the leading character string from the one line with the leading character string being regarded as a cascade header, and apply only the resulting text portion to the translation processor 4.

If no cascade format is detected, the layout analyzing section 17 causes the source document storage section 2 to apply the source document as it is to the translation processor 4 so that the source document is subjected to an ordinary translation process.

As a result, only the text portion in the source document which includes no cascade header is sent to the translation processor 4. Therefore, adverse effects of the cascade header can be eliminated such that the source document is erroneously analyzed or a translation range for one sentence is erroneously specified due to the presence of the cascade header.

After completion of the translation process, the translated text is stored in the translation storage section 2. If the translated text is derived from a cascaded source document portion, the layout analyzing section 17 causes the translation storage section 5 to prefix the cascade header to the translated text. Then, the resulting translation is sent to the outputting section 6. If the translated text is derived from a non-cascaded source document portion, the translated text is sent to the outputting section 6 as it is.

In the interpreter according to the present invention, the translation to be outputted is finally arranged in the cascade format, as in the source document, through the cascade processing operation performed by the cascade detecting section 8 in the layout analyzing section.

In accordance with Embodiment 2, the one line is not only compared with the next line but also with subsequent $L_1$ lines in the source document in the cascade detecting operation performed by the cascade detecting section 8 and, if the one line has the same leading character string as any of the subsequent lines and the leading character string includes a plurality of symbols or space characters arranged in succession, the one line is regarded as being in the cascade format. Thus, the source document can properly be subjected to the cascade processing operation for translation thereof, even if the source document includes a greater length text line extending over two or more lines so that cascade headers (">>") are not prefixed successively to the respective lines in the cascade format as shown below:

```
>> A new generation CPU which speeds up a multimedia
   processing operation, a 32MB memory and a 1.6GB HDD
>> are incorporated, . . . .
```

In accordance with Embodiment 3, the user specification section 18 permits a user to specify the number $L_1$ of the successive lines as a parameter $L_1$, which is used for the cascade detecting operation by the cascade detecting section 8.

In accordance with Embodiment 4, the cascade exception detecting section 9 checks the line regarded as being in the cascade format by the cascade detecting section 8. More specifically, if the cascade header does not include a predetermined character string, the cascade exception detecting section 9 negates the detection of the cascade format, and the layout analyzing section 17 causes the source document storage section 2 to send the line of the source document to the translation processor 4 for the ordinary translation process.

In accordance with Embodiment 5, the user specification section 18 permits a user to specify the character string for the cascade header as a parameter which is used for the cascade exception detecting operation by the cascade exception detecting section 9.

In accordance with Embodiment 6, when the translation storage section 5 receives a cascade header prefixing command from the cascade detecting section 8 with the translated text stored therein after a cascade translation process, the translation storage section 5 inserts line-feeds at predetermined length intervals in the translated text and prefixes the cascade header to each of lines in the translated text, instead of simply prefixing the cascade header to the translated text. Then, the resulting translation is sent to the outputting section 6.

The operations to be performed by the cascade detecting section 8 and the cascade exception detecting section 9 in Embodiments 1 to 6 will hereinafter be described with reference to the flow charts shown in FIGS. 2 and 3.

Figure 2:
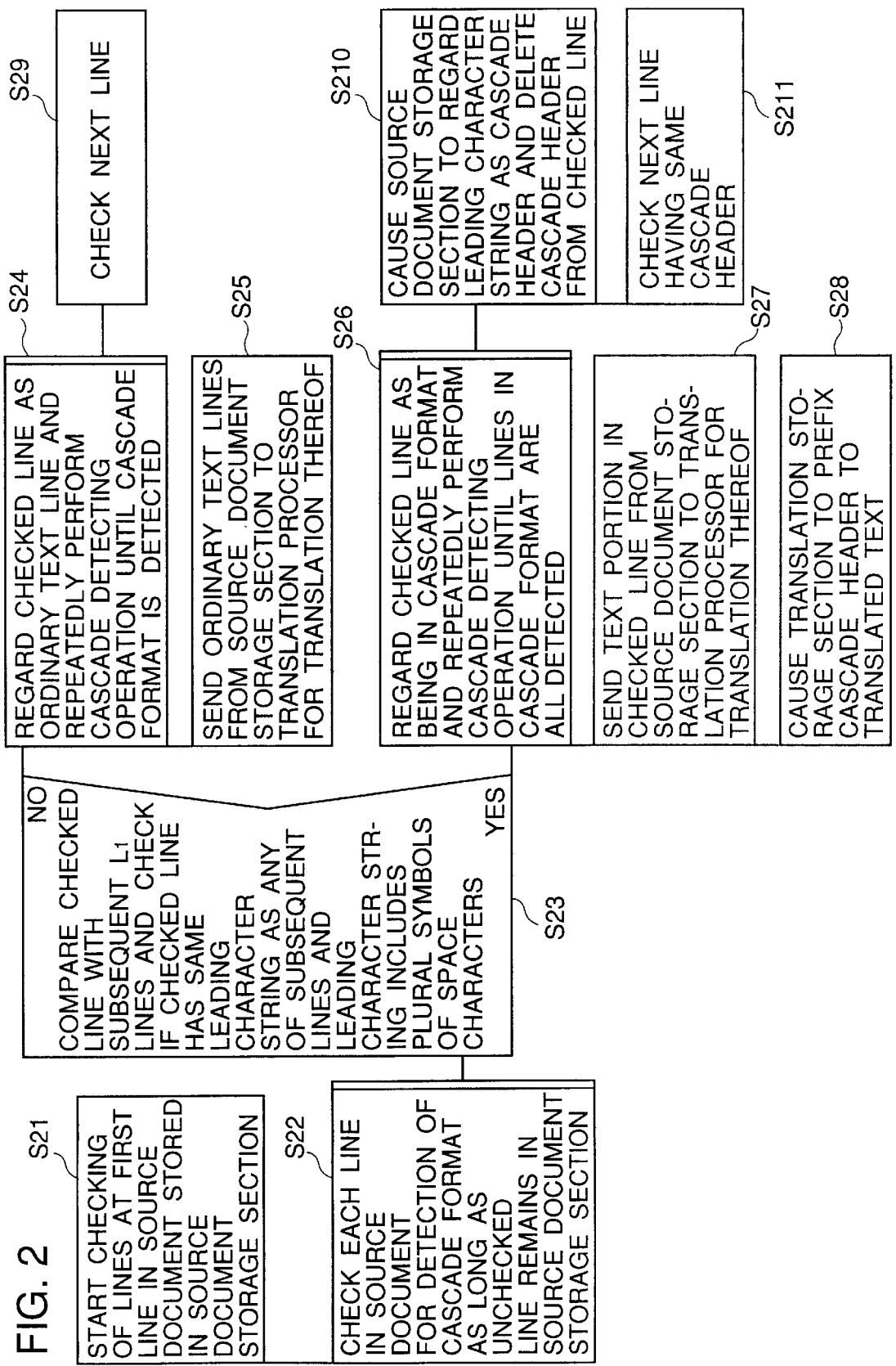
FIG. 2 is a flow chart illustrating operations to be performed by a cascade detecting section according to the present invention.

FIG. 2 is a flow chart illustrating operations to be performed by the cascade detecting section according to the present invention. As shown, the cascade detecting section 8 checks a leading character string in each line in the source document stored in the source document storage section 2 for the detection of the cascade format.

The checking of the leading character string is started at the first line in the source document stored in the source document storage section 2 (Step S21), and repeated until all the lines in the source document are sent to the translation processor (Step S22).

As previously described, the checking for the detection of the cascade format is achieved by comparing a currently checked line with each of the subsequent LI lines (Step S23). If a leading character string in the currently checked line does not match a leading character string in any of the subsequent lines, the checked line is regarded as an ordinary text line. On the other hand, if the currently checked line has the same leading character string as any of the subsequent lines and the leading character string includes a plurality of symbols or space characters arranged in succession, the checked line is regarded as being in the cascade format.

Where the ordinary text line is detected, the cascade detecting operation is carried out until the cascade format is detected or all the lines in the source document are checked (Step S24), and the layout analyzing section causes the source document storage section 2 to send ordinary text lines collectively to the translation processor 4 (Step S25).

Where the cascade format is detected, the cascade detecting operation is carried out until lines in the cascade format are all detected (Steps S26, S211), and the layout analyzing section causes the source document storage section 2 to delete the leading character string from each of the lines in the cascade format with the leading character string being regarded as the cascade header (Step S210).

The layout analyzing section causes the source document storage section 2 to send only the resultant text portions of the respective lines in the source document including no cascade header to the translation processor 4 (Step S27). The text portions are subjected to the translation process, and a translated text is sent to the translation storage section 5. The layout analyzing section causes the translation storage section 5 to insert line-feeds at predetermined length intervals in the translated text and prefix the cascade header to each of lines in the translated text (Step S28).

Figure 3:
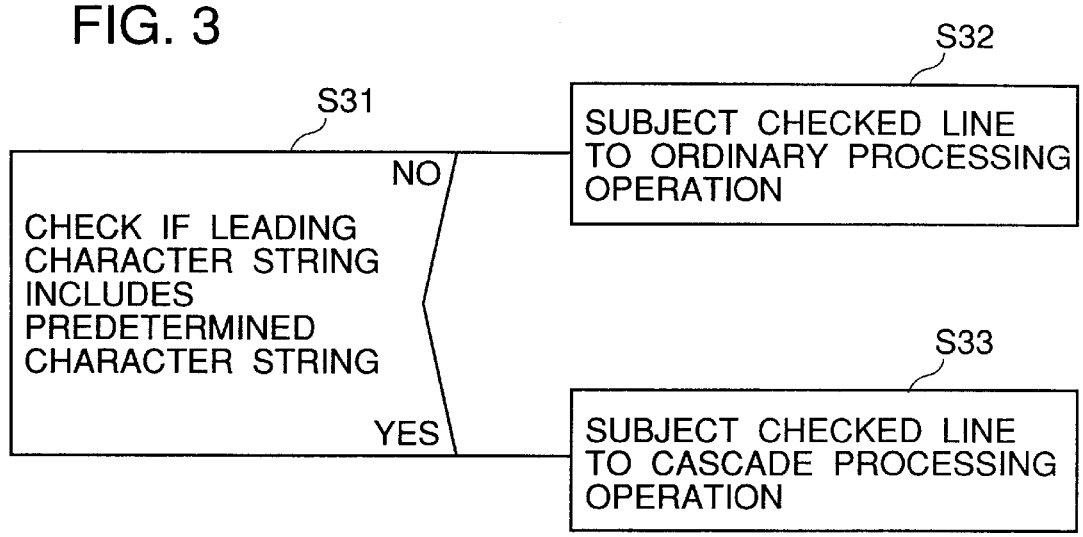
FIG. 3 is a flow chart illustrating operations to be performed by a cascade exception detecting section according to the present invention.

FIG. 3 is a flow chart illustrating operations to be performed by the cascade exception detecting section according to the present invention. Where the layout analyzing section includes the cascade exception detecting section 9, a cascade exception detecting operation is performed. More specifically, even if the checked line is regarded as being in the cascade format by the cascade detecting section 8 in Step S23, the cascade processing operation subsequent to Step S26 is not performed immediately thereafter, but the line regarded as being in the cascade format is checked for an exception to the cascade detection (Step S31).

As previously described, the leading character string in the line is checked. If the leading character string does not include a predetermined character string, the checked line is not regarded as being in the cascade format but as an ordinary text line, and is subjected to the ordinary processing operation (Step S32). Step S32 corresponds to a process sequence subsequent to Step S24 to be performed by the cascade detecting section 8.

Where the checked line does not satisfy the condition for the cascade exception, the line is subjected to the cascade processing operation (Step S33). Step S33 corresponds to a process sequence subsequent to Step S26 to be performed by the cascade detecting section 8. Thus, the cascade detecting section 8 and the cascade exception detecting section 9 perform the operations in accordance with the aforesaid process flow.

An explanation will hereinafter be given to operations to be performed by the itemization detecting section 10 and the itemization exception detecting section 11 in accordance with Embodiments 7 to 11.

The following is an exemplary source document in an itemization format (where symbol "♦" is a itemization header):

♦ High performance design incorporating a new generation CPU.

♦ Advanced business software is installed.

♦ "Multimedia personal information management software" is installed which realizes group utilization.

In accordance with Embodiment 7, the source document inputted from the inputting section to the source document storage section 2 is subjected to an itemization detecting operation to be performed for detection of the itemization format by the itemization detecting section 10 in the layout analyzing section 17 before the source document is sent to the translation processor.

Like the cascade detecting operation to be performed by the cascade detecting section 8, the itemization detecting operation in the itemization detecting section 10 is achieved by comparing one line in the source document stored in the source document storage section with the next line. If the one line has the same leading character string consisting of $N_7$ (>0) characters as the next line and the leading character string includes a single symbol, the one line is regarded as being in the itemization format.

The itemization detecting operation to be performed by the itemization detecting section 10 is substantially the same as the cascade detecting operation to be performed by the cascade detecting section 8.

If the itemization format is detected, the leading character string is regarded as an itemization header and separated from a text portion of the checked line. The layout analyzing section 17 causes the source document storage section 2 to send the text portion to the translation processor 4 with the text portion being regarded as a complete sentence.

If the itemization format is not detected, the layout analyzing section 17 causes the source document storage section 2 to send the source document to the translation processor 4 as it is for the ordinary translation thereof.

Therefore, adverse effects of the itemization header can be eliminated such that the source document is erroneously analyzed or a line in the itemization format is mistakenly regarded as being continued from a preceding line and subjected to the ordinary translation process.

After the translation process, a translated text is stored in the translation storage section 5. Where the translated text is derived from an itemized source document portion, the layout analyzing section 17 causes the translation storage section 5 to prefix the itemization header to the translated text and output the resulting translation. Where the translated text is not derived from the itemized source document portion, the translated text is sent to the outputting section 6 as it is.

In the interpreter according to the present invention, the itemization detecting section 10 in the layout analyzing section allows the translated text line to be finally arranged in the itemization format in a final translation document as in the source document and the final translation document is outputted.

In accordance with Embodiment 8, the itemization detecting section 10 compares the one line in the source document not only with the next line but also with the subsequent $L_1$ lines for detection of the itemization format and, if the one line has the same leading character string as any of the subsequent lines and the leading character string includes a single symbol, regards the one line as being in the itemization format.

Thus, even if the source document includes a greater length text line extending over two or more lines so that itemization headers are not prefixed successively to the respective lines in the itemization format, the source document can properly be subjected to the itemization processing operation for translation thereof.

In accordance with Embodiment 9, the user specification section 18 permits a user to specify the number $L_1$ of the subsequent lines as a parameter $L_1$, which is used for the itemization detecting operation by the itemization detecting section 10.

In accordance with Embodiment 10, the itemization exception detecting section 11 checks the line regarded as being in the itemization format by the itemization detecting section 10. More specifically, if the itemization header does not include a predetermined symbol, the itemization exception detecting section 11 negates the detection of the itemization format, and the layout analyzing section 17 causes the source document storage section 2 to apply the source document to the translation processor 4 for the ordinary translation process.

In accordance with Embodiment 11, the user specification section 18 permits a user to specify the symbol to be included in the leading character string as a parameter, which is used for the itemization exception detecting operation by the itemization exception detecting section 9.

The operations to be performed by the itemization detecting section 8 and the itemization exception detecting section 9 in Embodiments 7 to 11 will hereinafter be described with reference to the flow charts shown in FIGS. 4 and 5.

Figure 4:
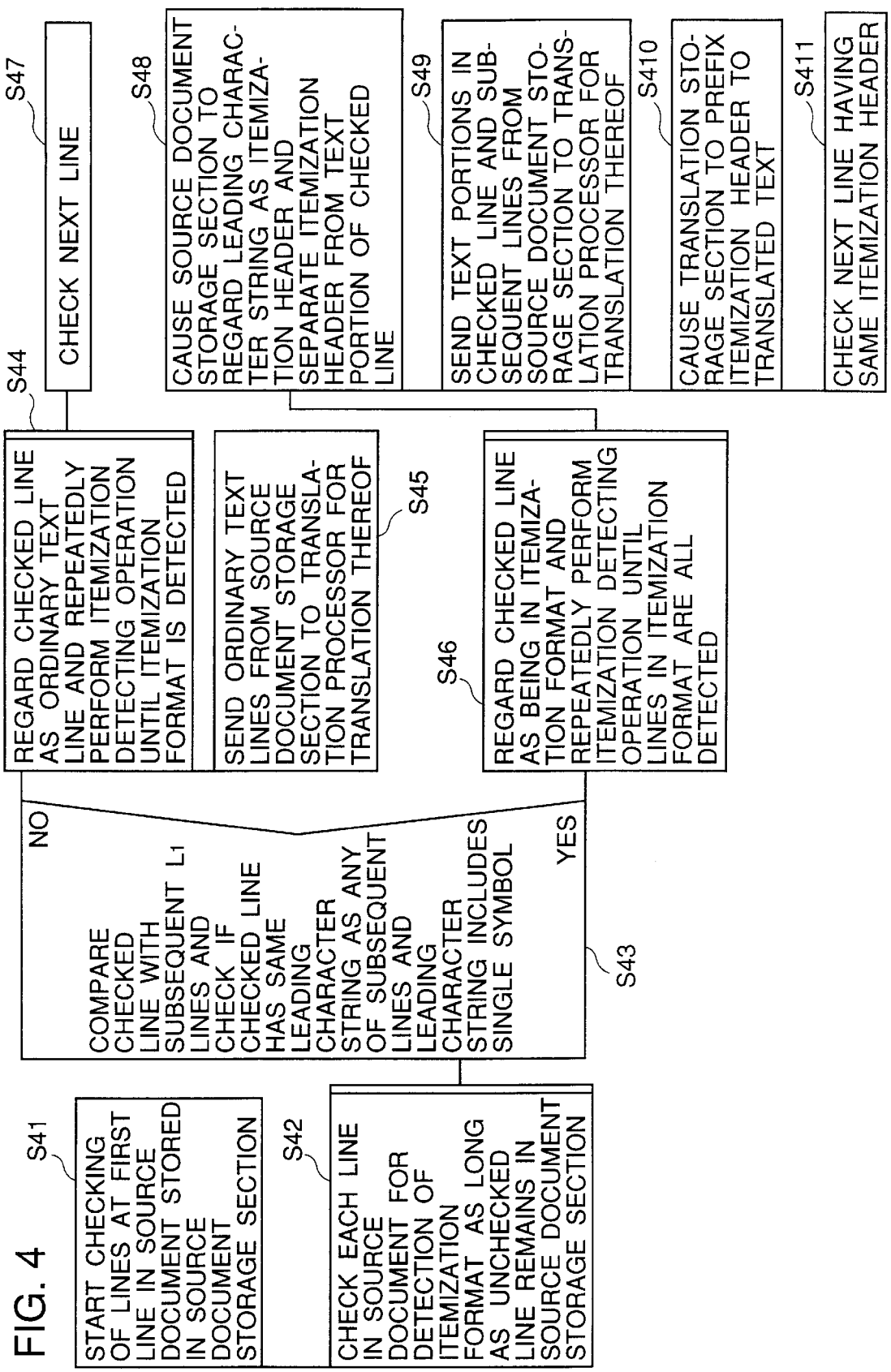
FIG. 4 is a flow chart illustrating operations to be performed by an itemization detecting section according to the present invention.

FIG. 4 is a flow chart illustrating operations to be performed by the itemization detecting section according to the present invention. As shown, the itemization detecting section 10 checks leading character strings in the respective lines of the source document stored in the source document storage section 2 for detection of the itemization format.

The checking of the leading character strings is started at the first line in the source document stored in the source document storage section 2 (Step S41), and repeated until all the lines in the source document are sent to the translation processor (Step S42).

As previously described, the checking for the detection of the itemization format is achieved by comparing a currently checked line with each of the subsequent $L_1$ lines (Step S43). If a leading character string in the currently checked line does not match a leading character string in any of the subsequent lines, the checked line is regarded as an ordinary text line. On the other hand, if the currently checked line has the same leading character string as any of the subsequent lines and the leading character string includes a single symbol, the checked line is regarded as being in the itemization format.

Where the ordinary text line is detected, the itemization format detecting operation is carried out until the itemization format is detected or all the lines in the source document are checked (Steps S44, S47), and the layout analyzing section causes the source document storage section 2 to send ordinary text lines collectively to the translation processor 4 (Step S45).

Where the itemization format is detected, the itemization detecting operation is carried out until lines in the itemization format are all detected (Steps S46, S411), and the layout analyzing section causes the source document storage section 2 to separate the leading character string from a text portion of the checked line with the leading character string being regarded as the itemization header (Step S48) and send to the translation processor 4 a source document text extending from the checked line to a line preceding the line that has the same itemization header as the checked line (Step S49). The source document text is subjected to the translation process, and a translated text is stored in the translation storage section 5. The layout analyzing section causes the translation storage section 5 to prefix the itemization header to the translated text (Step S410).

Figure 5:
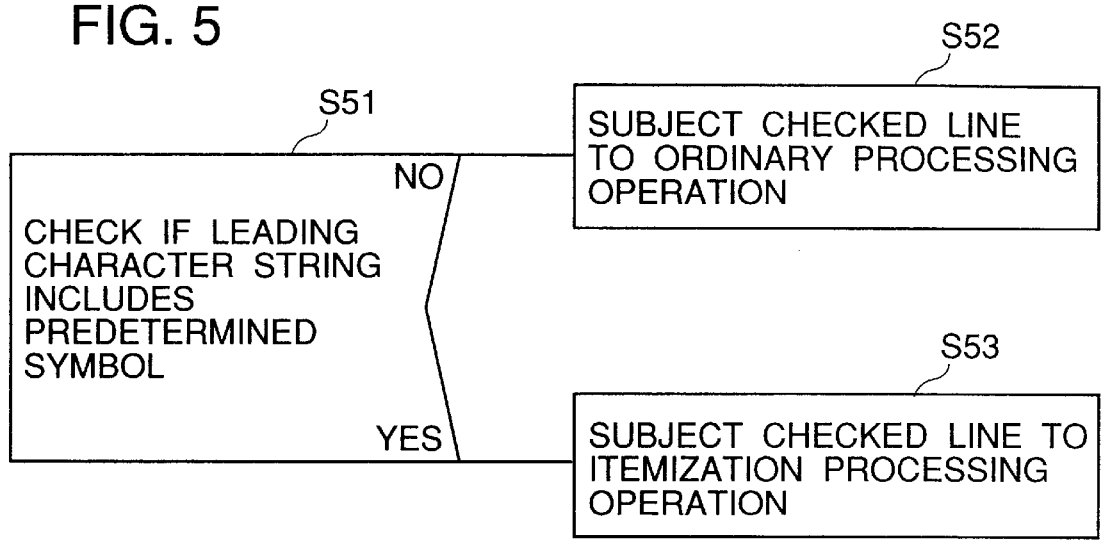
FIG. 5 is a flow chart illustrating operations to be performed by an itemization exception detecting section according to the present invention.

FIG. 5 is a flow chart illustrating operations to be performed by the itemization exception detecting section according to the present invention. Where the layout analyzing section includes the itemization exception detecting section 9, an itemization exception detecting operation is performed. More specifically, even if the checked line is regarded as being in the itemization format by the itemization detecting section 11 in Step S43, the itemization processing operation subsequent to Step S46 is not performed immediately thereafter, but the line regarded as being in the itemization format is checked for an exception to the itemization detection (Step S51).

As previously described, the leading character string in the line is checked. If the leading character string does not include a predetermined symbol, the checked line is not regarded as being in the itemization format but as an ordinary text line, and is subjected to the ordinary processing operation (Step S52). Step S52 corresponds to a process sequence after Step S44 to be performed by the itemization detecting section 10.

Where the checked line does not satisfy the condition for the itemization exception, the checked line is subjected to the itemization processing operation (Step S53). Step S53 corresponds to a process sequence subsequent to Step 46 to be performed by the itemization detecting section 10. Thus, the itemization detecting section 10 and the itemization exception detecting section 11 perform the operations in accordance with the aforesaid process flow.

An explanation will be given to operations to be performed by the numbered itemization detecting section 12 and the numbered itemization exception detecting section 13 in accordance with Embodiments 12 to 20.

The following is an exemplary source document in a numbered itemization format:

1. High performance design incorporating a new generation CPU.
2. Advanced business software is installed.
3. "Multimedia personal information management software" is installed which realizes group utilization.

In Embodiment 12, the source document inputted from the inputting section to the source document storage section 2 is subjected to a numbered itemization detecting operation to be performed for detection of the numbered itemization format by the numbered itemization detecting section 12 in the layout analyzing section 17 before the source document is sent to the translation processor 4.

The numbered itemization detecting operation in the numbered itemization detecting section 12 is achieved by comparing one line in the source document stored in the source document storage section with the next line. If these lines respectively have leading character strings which include the same symbol and different numeric characters and numbers respectively represented by the numeric characters included in the leading character strings are in numerically ascending order, these lines are regarded as being in the numbered itemization format.

If the numbered itemization format is detected, the leading character strings are each regarded as a numbered itemization header and separated from text portions of the respective lines. The layout analyzing section 17 causes the source document storage section 2 to send the text portions to the translation processor 4 with the text portions being each regarded as a complete sentence.

Since only the text portions which include no numbered itemization header are sent to the translation processor 4, adverse effects of the numbered itemization headers can be eliminated such that the source document is erroneously analyzed or a line in the numbered itemization format is mistakenly regarded as being continued from a preceding line and subjected to the ordinary translation process.

After the translation process, translated texts are stored in the translation storage section 5. Where the translated texts are derived from a number-itemized source document portion, the layout analyzing section 17 causes the translation storage section 5 to prefix the numbered itemization headers to the corresponding translated texts and output the resulting translation. Where the translated texts are not derived from the number-itemized source document portion, the translated texts are sent to the outputting section as they are.

In the interpreter according to the present invention, the numbered itemization detecting section 12 in the layout analyzing section allows the translated texts to be finally arranged in the numbered itemization format in a final translation document as in the source document and the final translation document is outputted.

In accordance with Embodiment 13, the numbered itemization exception detecting section 13 checks the lines regarded as being in the numbered itemization format by the numbered itemization detecting section 12. More specifically, if the numbered itemization headers included in the lines regarded as being in the numbered itemization format by the numbered itemization detecting section each include a plurality of numerical characters arranged in succession and the number of the numeric characters is not smaller a predetermined maximum character number $N_{max}$, the numbered itemization exception detecting section 12 negates the detection of the numbered itemization format, and the layout analyzing section 17 causes the source document storage section 2 to apply the source document to the translation processor 4 for the ordinary translation process.

In accordance with Embodiment 14, the user specification section 18 permits a user to specify the maximum character number $N_{max}$ as a parameter $N_{max}$, which is used for the numbered itemization exception detecting operation by the numbered itemization exception detecting section 13.

In accordance with Embodiment 15, the numbered itemization detecting section 12 compares the one line in the source document not only with the next line but also with the subsequent LI lines for detection of the numbered itemization format and, if the one line and any of the successive lines respectively have leading character strings which include the same symbol and different numeric characters and numbers respectively represented by the numeric characters included in the leading character strings are in numerically ascending order, regards the one line as being in the numbered itemization format.

Thus, even if the source document includes a greater length text line extending over two or more lines so that numbered itemization headers are not prefixed successively to the respective lines in the numbered itemization format, the source document can properly be subjected to the numbered itemization processing operation for translation thereof.

In accordance with Embodiment 16, the user specification section 18 permits a user to specify the number $L_1$ of the subsequent lines as a parameter $L_1$, which is used for the numbered itemization detecting operation by the numbered itemization detecting section 12.

In accordance with Embodiment 17, the numbered itemization exception detecting section 13 checks the line regarded as being in the numbered itemization format by the numbered itemization detecting section 12. More specifically, if the leading character string in the line regarded as being in the numbered itemization format does not include a predetermined symbol, the numbered itemization exception detecting section 13 negates the detection of the numbered itemization format, and the layout analyzing section 17 causes the source document storage section 2 to apply the source document to the translation processor 4 for the ordinary translation process.

In accordance with Embodiment 18, the user specification section 18 permits a user to specify the predetermined symbol as a parameter, which is used for the numbered itemization exception detecting operation by the numbered itemization exception detecting section 13.

In accordance with Embodiment 19, if the checked lines in the source document respectively have leading character strings which include the same symbol and different numeric characters but numbers respectively represented by the numeric characters in the leading character strings are not in numerically ascending order, the numbered itemization detecting section 12 permits a user to determine whether or not these lines should be regarded as being in the numbered itemization format.

In accordance with Embodiment 20, the alphabetized itemization detecting section and the alphabetized itemization exception detecting section perform substantially the same operations as the numbered itemization detecting section and the numbered itemization exception detecting section, except that detection of the alphabetized itemization format is achieved by checking if lines in the source document respectively have leading character strings which include the same symbol and different alphabets and if the alphabets respectively included in the leading character strings are in alphabetically ascending order.

In Embodiments 12 to 20, the operations to be performed by the numbered itemization detecting section 12 and the numbered itemization exception detecting section 13 are substantially the same as those to be performed by the itemization detecting section 10 and the numbered itemization exception detecting section 11 as shown in FIGS. 4 and 5. More specifically, the numbered itemization detecting operation and the numbered itemization exception detecting operation a re different from the itemization detecting operation in Steps S43, S44 and S46 and the itemization exception detecting operation in Step S51.

In the numbered itemization detecting operation corresponding to Steps S43, S44 and S46, the numbered itemization detecting section 12 compares one line with the next line or with a predetermined number of subsequent lines in the source document and, if the one line and any of the subsequent lines respectively have leading character strings which include the same symbol and different numeric characters and numbers respectively represented by the numeric characters in the leading character strings are in numerically ascending order, regards the one line as being in the numbered itemization format. The comparison of the lines is performed by the general purpose processor 7.

In the numbered itemization exception detecting operation corresponding to Step S51 in accordance with Embodiment 13, the numbered itemization exception detecting section 13 negates the detection of the numbered itemization format if the leading character string included in the line regarded as being in the numbered itemization format includes a plurality of numeric characters arranged in succession and the number of the numeric characters is not smaller than a predetermined maximum character number $N_{max}$. Then, the line is regarded as an ordinary text line, and subjected to the ordinary process as in Step S52. The number of the numeric characters is determined by the general purpose processor 7.

In the numbered itemization exception detecting operation in accordance with Embodiment 17, the numbered itemization exception detecting section 13 negates the detection of the numbered itemization format, if the leading character strings in the line regarded as being in the numbered itemization format do not include a predetermined symbol. Then, the line is regarded as an ordinary text line, and subjected to the ordinary process as in Step S52.

In the numbered itemization detecting operation in accordance with Embodiment 19, the numbered itemization detecting section 12, if the checked lines in the source document respectively have leading character strings which include the same symbol and different numeric characters but the numbers respectively represented by the numeric characters in the leading character strings are not in numerically ascending order, permits a user to determine whether or not the lines should be regarded as being in the numbered itemization format. If the user regards the lines as ordinary text lines, the lines are each subjected to the ordinary process as in Step S52.

An explanation will be given to operations to be performed by the labeled itemization detecting section 14 and the labeled itemization exception detecting section 15 in accordance with Embodiments 21 and 28.

In accordance with Embodiment 21, the source document applied to the source document storage section 2 from the inputting section 1 is checked by the labeled itemization detecting section 14 in the layout analyzing section 17 for detection of the labeled itemization format before the source document is sent to the translation processor 4.

The following is an exemplary source document in the labeled itemization format:

Memory: 32 MB

Hard disk: 1.6 GB

Software installed:Many software packages including Power E/J, Power Shoin and Power PIMM Date of release: May 10th.

In this embodiment, the labeled itemization separator is defined as ":" in the labeled itemization detecting section 14.

The labeled itemization detecting section 14 performs the labeled itemization detecting operation by checking two successive lines in the source document stored in the source document storage section 2 and, if the labeled itemization separator is detected in these lines, regarding the lines as being in the labeled itemization format.

The labeled itemization detecting operation, which is performed in the same manner in Embodiments 21 to 28, will be described later with reference to flow charts shown in FIGS. 6 and 7.

If the labeled itemization detecting section 14 detects the labeled itemization format, the layout analyzing section 17 causes the source document storage section 2 to separate a leading character string having the labeled itemization separator at its end from a subsequent text portion in each of the lines in the labeled itemization format with the leading character string being regarded as a labeled itemization header and send the leading character string as the labeled itemization header and the text portion separately to the translation processor 4.

If the labeled itemization format is not detected, the layout analyzing section 17 causes the source document storage section 2 to send the source document to the translation processor 4 as it is for the ordinary translation thereof.

Therefore, adverse effects of the labeled itemization header can be eliminated such that the source document is erroneously analyzed or a line in the labeled itemization format is mistakenly regarded as being continued from a preceding line and subjected to the ordinary translation process.

After the translation process, translated labeled itemization headers, if any, and translated texts are separately stored in the translation storage section 5. Where the translated texts are derived from a label-itemized source document portion, the layout analyzing section 17 causes the translation storage section 5 to prefix the translated labeled itemization headers to the corresponding translated texts and output the resulting translation. Where the translated texts are not derived from the label-itemized source document portion, the translated texts are sent to the outputting section 6 as they are.

In the interpreter according to the present invention, the labeled itemization detecting section 14 in the layout analyzing section allows the translated texts to be finally arranged in the labeled itemization format in a final translation document as in the source document, and the final translation document is outputted.

In accordance with Embodiment 22, the labeled itemization detecting section 14 performs the labeled itemization detecting operation by checking successive $L_1$ lines in the source document stored in the source document storage section 2 instead of checking the two successive lines and, if the labeled itemization separator is detecting in the first line and any other line of the successive $L_1$ lines, regarding the lines as being in the labeled itemization format.

Thus, the source document can properly be subjected to the labeled itemization processing operation for translation thereof, even if the source document includes a greater length text line extending over more than two lines so that labeled itemization headers are not prefixed successively to the respective lines in the labeled itemization format as shown below:

Memory: 32 MB
Hard disk: 1.6 GB
Software installed:Many software packages including Power E/J, Power Shoin and Power PIMM
Date of release: May 10th.

In accordance with Embodiment 23, the user specification section 18 permits a user to specify the number $L_1$ of the successive lines to be checked as a parameter $L_1$, which is used for the labeled itemization detecting operation by the labeled itemization detecting section 8.

In accordance with Embodiment 24, the labeled itemization separator to be detected by the labeled itemization detecting section 14 is a colon (:).

In accordance with Embodiment 25, the user specification section 18 permits a user to specify the labeled itemization separator to be detected by the labeled itemization detecting section 14 for the labeled itemization detecting operation.

In accordance with Embodiment 26, the labeled itemization exception detecting section 15 checks the lines regarded as being in the labeled itemization format by the labeled itemization detecting section 14. More specifically, if a predetermined labeled itemization exception character string followed by the labeled itemization separator is included in the labeled itemization headers in the lines regarded as being in the labeled itemization format by the labeled itemization detecting section 14, the labeled itemization exception detecting section 15 negates the detection of the labeled itemization format, and the layout analyzing section 17 causes the source document storage section 2 to apply the source document to the translation processor 4 for the ordinary translation process.

In accordance with Embodiment 27, the predetermined labeled itemization exception character string is "TEL" or "FAX" and, if a line regarded as being in the labeled itemization format includes a labeled itemization header having "TEL" or "FAX" followed by the labeled itemization separator, the line is subjected to the ordinary processing operation.

In accordance with Embodiment 28, the user specification section 18 permits a user to specify the labeled itemization exception character which is used for the labeled itemization exception detecting operation.

The operations to be performed by the labeled itemization detecting section 14 and the labeled itemization exception detecting section 15 in Embodiments 21 to 28 will hereinafter be described with reference to the flow charts shown in FIGS. 6 and 7.

Figure 6:
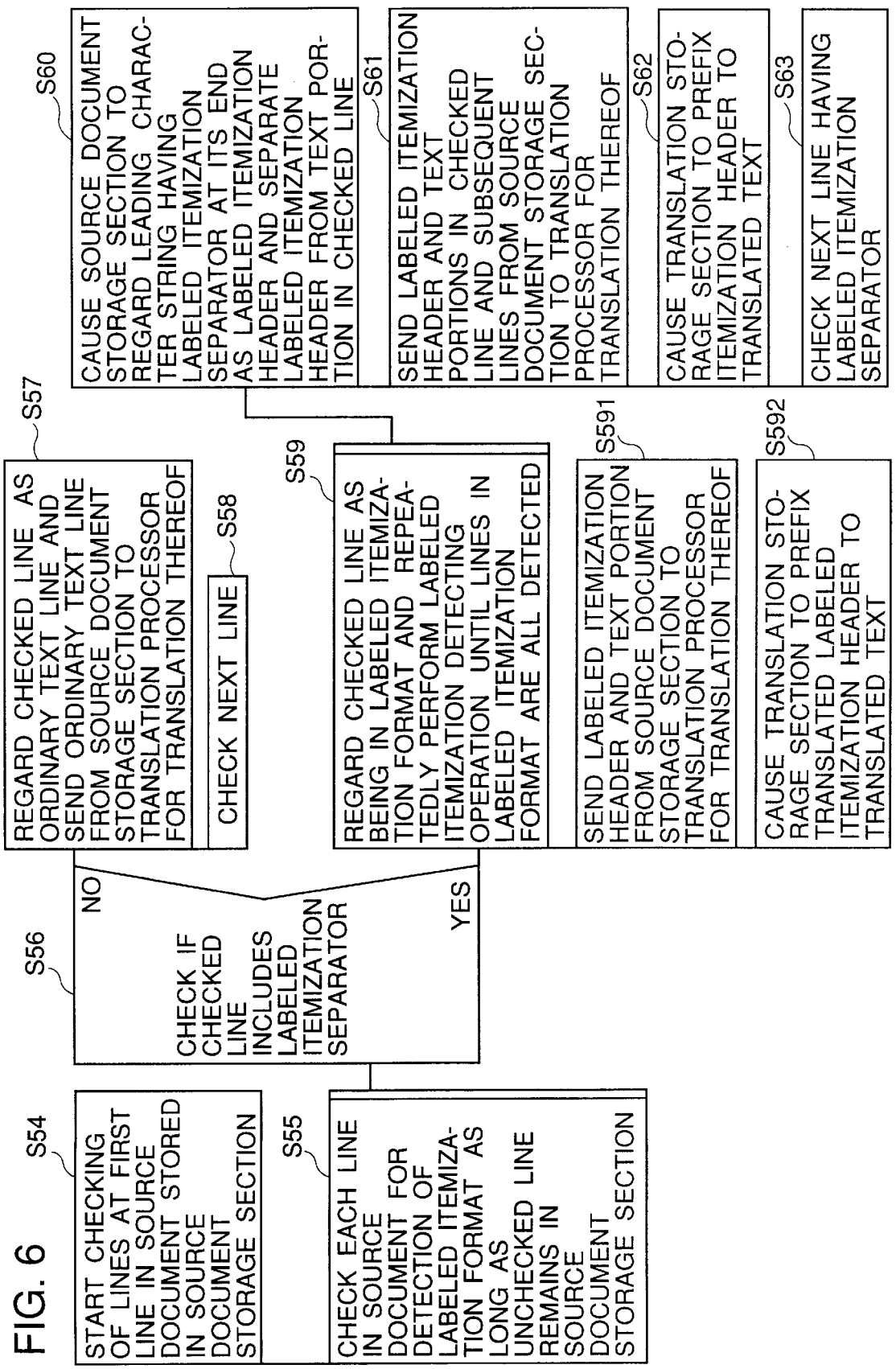
FIG. 6 is a flow chart illustrating operations to be performed by a labeled itemization detecting section according to the present invention.

FIG. 6 is a flow chart illustrating operations to be performed by the labeled itemization detecting section according to the present invention. In order to detect the labeled itemization format, the labeled itemization detecting section 14 checks the respective lines in the source document stored in the source document storage section 2 for detection of the labeled itemization separator (Step S56).

The checking of the lines is started at the first line in the source document stored in the source document storage section 2 (Step S54), and repeated until all the lines in the source document are sent to the translation processor (Step S55). As previously described, the detection of the labeled itemization format is based on the presence of the labeled itemization separator in a checked line.

If the checked line includes the labeled itemization separator (Step S56) and any of the subsequent $L_1$ lines also includes the labeled itemization separator (Step S59), the checked line is regarded as being in the labeled itemization format (Step S60). If an ordinary text line is detected, the labeled itemization detecting operation is carrier out until the labeled itemization separator is detected in any of the lines in the source document (Step S56). Then, the layout analyzing section causes the source document storage section 2 to send detected ordinary text lines collectively to the translation processor 4 (Step S57).

If the labeled itemization format is detected, the labeled itemization detecting operation is carried out until lines in the labeled itemization format are all detected (Step S59), and the layout analyzing section causes the source document storage section 2 to separate a leading character string having the labeled itemization separator at its end from a subsequent text portion in each of the lines (Step S60).

The layout analyzing section causes the source document storage section 2 to send the labeled itemization header and the text portion separately to the translation processor 4 (S591). After the labeled itemization header and the text portion are separately subjected to the translation process, the layout analyzing section causes the translation storage section 5 to prefix the translated labeled itemization header to the translated text line (Step S592).

Figure 7:
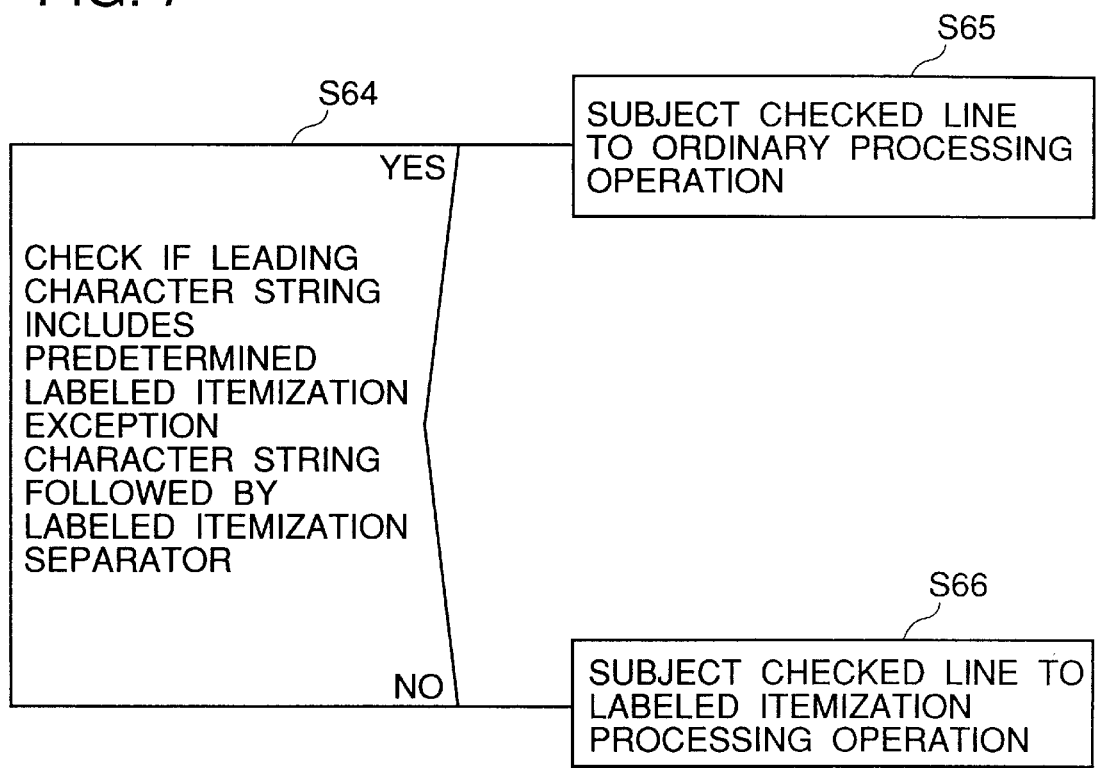
FIG. 7 is a flow chart illustrating operations to be performed by a labeled itemization exception detecting section according to the present invention.

FIG. 7 is a flow chart illustrating operations to be performed by the labeled itemization exception detecting section. Where the layout analyzing section includes the labeled itemization exception detecting section 15, a labeled itemization exception detecting operation is performed. More specifically, even if the labeled itemization separator is detected in the checked line by the labeled itemization detecting section 14 in Step S56, the labeled itemization processing operation subsequent to Step S59 is not performed immediately thereafter, but the line regarded as being in the labeled itemization format is checked for an exception to the labeled itemization detection (S64).

As previously described, if the labeled itemization header of the line regarded as being in the labeled itemization format includes the labeled itemization exception character string followed by the labeled itemization separator, the labeled itemization exception detecting section 15 negates the detection of the labeled itemization format. Then, the line is regarded as an ordinary text line and subjected to the ordinary processing operation (Step S65). Step S65 corresponds to a process sequence subsequent to Step S57 to be performed by the labeled itemization detecting section 14.

If the checked line does not satisfy the conditions for the labeled itemization exception, the line is subjected to the labeled itemization processing operation (S66). Step S66 corresponds to a process sequence subsequent to Step S59 to be performed by the labeled itemization detecting section 14. Thus, the labeled itemization detecting section 14 and the labeled itemization exception detecting section 15 perform the operations in accordance with the aforesaid process flow.

An explanation will be given to operations to be performed by the separator line detecting section 16 in accordance with Embodiments 29 to 32.

In accordance with Embodiment 29, the source document inputted from the inputting section 1 to the source document storage section 2 is subjected to a separator line detecting operation to be performed for detection of a separator line by the separator line detecting section 16 in the layout analyzing section 17 before the source document is sent to the translation processor 4.

The following is an exemplary source document which includes a separator line. A new generation CPU which speeds up a multimedia processing operation, a 32 MB memory and a 1.6 GB HDD are incorporated, offering advantages in high speed processing and high capacity data processing which are required for multimedia and business applications.

---
========================================
For more information, please contact:
    Consumer Center . . .
(In this example, the line consisting of a plurality of "=" symbols arranged in succession is the separator line.)

---

The separator line detecting operation is achieved by detecting a sequence of identical characters of a number not smaller than a predetermined number $N_{29}$ in the source document stored in the source document storage section 2. If a sequence of $N_{29}$ or more identical characters is detected, the sequence of the identical characters is regarded as a separator line.

The separator line detecting operation, which is performed in the same manner by the separator line detecting section 16 in Embodiments 29 to 32 will be described later with reference to a flow chart shown in FIG. 8.

If the separator line detecting section 16 detects the separator line, the separator line is regarded as an independent line. Therefore, the layout analyzing section 17 causes the source document storage section 2 to regard sentences preceding and following the separator line as separate sentences.

Since the sentences preceding and following the separator line are separately applied to the translation processor 4, an adverse effect of the separator line can be eliminated such that the separator line is mistakenly regarded as part of the preceding or following sentence.

In accordance with Embodiment 30, the user specification section 18 permits a user to specify the number $N_{29}$ of the identical characters as a parameter $N_{29}$, which is used for the separator line detecting operation.

In accordance with Embodiment 31, the separator line detecting operation is performed in substantially the same manner as in Embodiment 29 by detecting a sequence of symbols of a number not smaller than a predetermined number $N_{31}$ in the source document stored in the source document storage section 2 instead of detecting a sequence of $N_{29}$ or more identical characters.

In accordance with Embodiment 32, the user specification section 18 permits a user to specify the number $N_{30}$ of the symbols as a parameter $N_{30}$, which is used for the separator line detecting operation. It is noted that the user can specify different values for the parameters $N_{29}$ and $N_{31}$.

The operations to be performed by the separator detecting section 16 in accordance with Embodiments 29 to 32 will be described with reference to the flow chart shown in FIG. 8.

Figure 8:
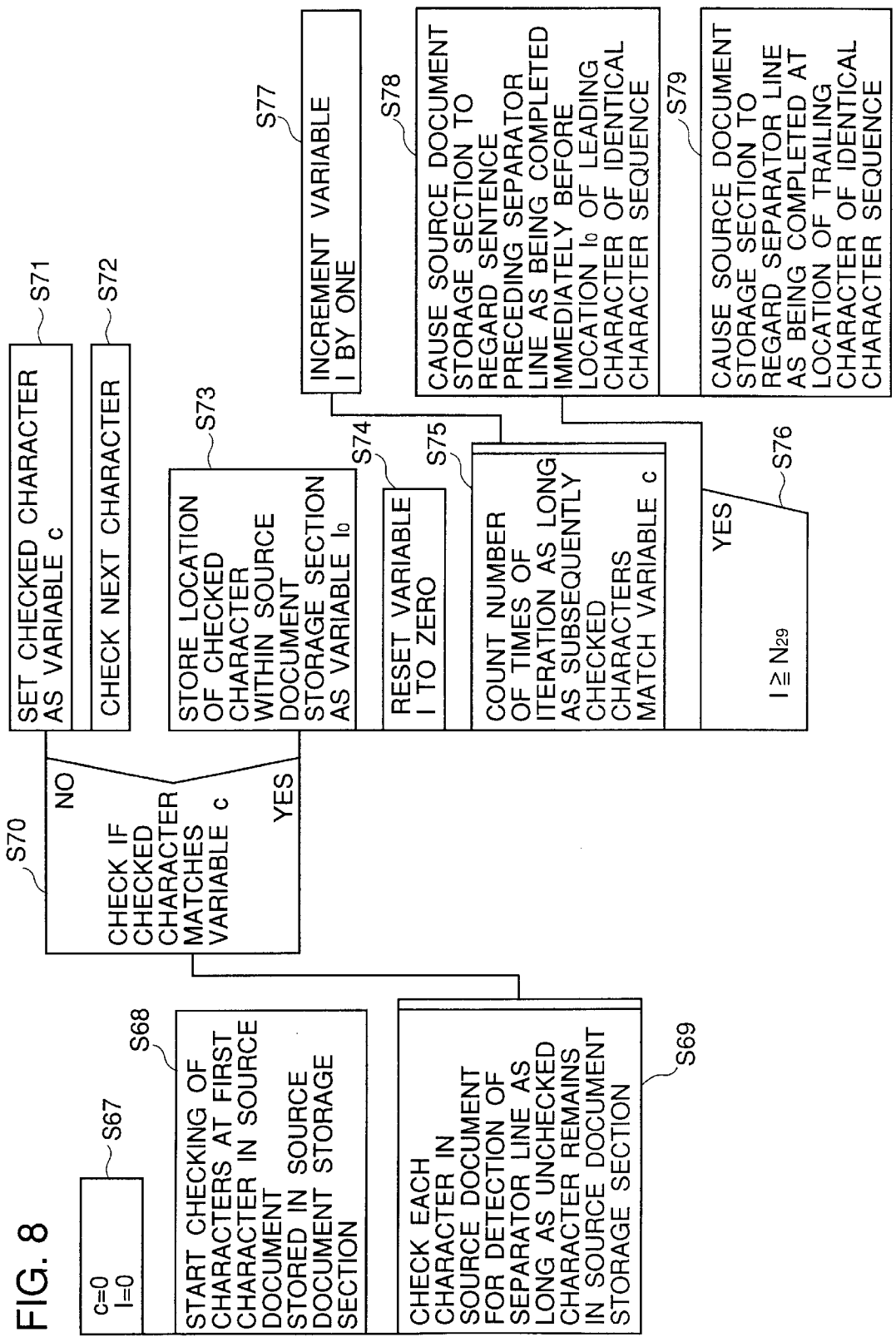
FIG. 8 is a flow chart illustrating operations to be performed by a separator line detecting section according to the present invention.

FIG. 8 is the flow chart illustrating the operations to be performed by the separator line detecting section. For the detection of a separator line, the separator line detecting section 16 detects a sequence of $N_{29}$ or more identical characters in the source document stored in the source document storage section 2. The separator line detecting section 16 first initializes internal variables c and I (Step S67) and then checks characters in the source document on a one-by-one basis. The checking of the characters is started at the first character in the source document stored in the source document storage section 2 (Step S68), and is carried out until all the characters in the source document are sent to the translation processor (Step S69).

For the detection of the separator line, a sequence of $N_{29}$ or more identical characters is detected as described above. A character to be checked is compared with the internal variable c (Step S70). If the character does not match the internal variable c, the character is set as the internal variable c for the next character check (Step S71). Then, the next character is checked (Step S72), and this operation is repeated (Step S69).

If the character matches the internal variable c, there is a possibility that the character is part of the separator line and, therefore, the location of the character within the source document storage section is stored as an internal variable lo in the separator line detecting section 16 (Step S73). After the variable I as a counter is reset, the variable I is incremented for counting the number of times of repetition of this operation (S77) as long as the subsequent characters match the variable c. Then, the repetition number I is compared with $N_{29}$. If the repetition number I is equal to or greater than $N_{29}$, the sequence of the identical characters is regarded as a separator line and subjected to a separator line processing operation. If not, the process returns to the aforesaid iteration loop (S69).

In the separator line processing operation, the layout analyzing section causes the source document storage section to regard a sentence preceding the separator line as being completed immediately before the location lo of the leading character of the identical character sequence (Step S78). Thus, the separator line is regarded as a line separate from the preceding sentence. Then, the layout analyzing section causes the source document storage section to regard the separator line as being completed at the location of the trailing character of the identical character sequence (Step S79). Thus, the separator line is regarded as a line separate from a sentence following the separator line. Therefore, the separator line is regarded as a line independent of the preceding and following sentences.

Thus, the separator line detecting operation and the separator line processing operation are performed in the aforesaid manner by the separator line detecting section 16.

The separator line detecting operation according to Embodiment 31 is performed in substantially the same manner by detecting a sequence of symbols instead of detecting a sequence of identical characters and, therefore, will not be described in detail.

The interpreter according to the present invention can properly analyze various layout information in a source document, correctly specify a translation range, and translate a source document text in the specified translation range into another language with an improved translation accuracy.

While the present invention has thus been described in detail by way of the embodiments thereof, it should be understood that the embodiments are merely illustrative of the invention but not limitative of the same. The spirit and scope of the invention are to be limited only by the appended claims.

What is claimed is:

1. A translation apparatus comprising: an inputting section for inputting a source document in a natural language; a layout analyzing section for analyzing layout information including cascade information, itemization information, numbered itemization information, labeled itemization information and separator line information in the source document inputted by the inputting section and specifying a translation range on the basis of the layout information; a translation processing section for translating a source document text in the specified translation range into a second language; and an outputting section for outputting a translated text provided by the translation processing section.

2. A translation apparatus of claim 1, wherein the layout analyzing section comprises a cascade detecting section for detecting a cascade format by comparing one line with the next line in the source document and, if the one line has the same leading character string of a predetermined length as the next line and the leading character string includes a plurality of symbols or space characters arranged in succession, regarding the one line as being in the cascade format, and performing a cascade processing operation by deleting the leading character string from the one line with the leading character string being regarded as a cascade header.

3. A translation apparatus of claim 1, wherein the layout analyzing section comprises a cascade detecting section for detecting a cascade format by comparing one line with a predetermined number of subsequent lines in the source document and, if the one line has the same leading character string of a predetermined length as any of the subsequent lines and the leading character string includes a plurality of symbols or space characters arranged in succession, regarding the one line as being in the cascade format, and performing a cascade processing operation by deleting the leading character string from the one line with the leading character string being regarded as a cascade header and regarding a line that follows the one line and does not include the cascade header as a continuation from the one line.

4. A translation apparatus of claim 2, wherein the cascade detecting section inserts line-feeds at predetermined length intervals in the translated text and prefixes the cascade header to each of lines of the translated text.

5. A translation apparatus of claim 2, wherein the layout analyzing section further comprises a cascade exception detecting section for negating the detection of the cascade format if a predetermined character string is not included in the leading character string in the line regarded as being in the cascade format by the cascade detecting section, and preventing the cascade detecting section from performing the cascade processing operation.

6. A translation apparatus of claim 1, wherein the layout analyzing section comprises an itemization detecting section for detecting an itemization format by comparing one line with the next line in the source document and, if the one line has the same leading character string of a predetermined length as the next line and the leading character string includes a single symbol, regarding the one line as being in the itemization format, and performing an itemization processing operation by separating the leading character string from a subsequent text portion in the one line with the leading character string being regarded as an itemization header.

7. A translation apparatus of claim 1, wherein the layout analyzing section comprises an itemization detecting section for detecting an itemization format by comparing one line with a predetermined number of subsequent lines in the source document and, if the one line has the same leading character string of a predetermined length as any of the subsequent lines and the leading character string includes a single symbol, regarding the one line as being in the itemization format, and performing an itemization processing operation by separating the leading character string from a subsequent text portion in the one line with the leading character string being regarded as an itemization header and regarding a line that follows the one line and does not include the itemization header as a continuation from the one line.

8. A translation apparatus of claim 6, wherein the layout analyzing section further comprises an itemization exception detecting section for negating the detection of the itemization format, if a predetermined symbol is not included in the leading character string in the line regarded as being in the itemization format by the itemization detecting section, and preventing the itemization detecting section from performing the itemization processing operation.

9. A translation apparatus of claim 1, wherein the layout analyzing section comprises a numbered itemization detecting section for detecting a numbered itemization format by comparing one line with the next line in the source document and, if the one line and the next line respectively have leading character strings which include the same symbol and different numeric characters and numbers respectively represented by the numeric characters included in the leading character strings are in numerically ascending order, regarding the one line as being in the numbered itemization format, and performing a numbered itemization processing operation by separating the leading character string from a subsequent text portion in the one line with the leading character string being regarded as a numbered itemization header.

10. A translation apparatus of claim 1, wherein the layout analyzing section comprises a numbered itemization detecting section for detecting a numbered itemization format by comparing one line with a predetermined number of subsequent lines in the source document and, if the one line and any of the subsequent lines respectively have leading character strings which include the same symbol and different numeric characters and numbers respectively represented by the numeric characters included in the leading character strings are in numerically ascending order, regarding the one line as being in the numbered itemization format, and performing a numbered itemization processing operation by separating the leading character string from a subsequent text portion in the one line with the leading character string being regarded as an itemization header and regarding a line that follows the one line and does not include the numbered itemization header as a continuation from the one line.

11. A translation apparatus of claim 9, wherein the layout analyzing section further comprises a numbered itemization exception detecting section for negating the detection of the numbered itemization format if the leading character string included in the line regarded as being in the numbered itemization format by the numbered itemization detecting section includes a plurality of numeric characters arranged in succession and the number of the numeric characters is greater than a predetermined maximum character number, and preventing the numbered itemization detecting section from performing the numbered itemization processing operation.

12. A translation apparatus of claim 9, wherein the layout analyzing section further comprises a numbered itemization exception detecting section for negating the detection of the numbered itemization format if the leading character string included in the line regarded as being in the numbered itemization format by the numbered itemization detecting section does not include a predetermined symbol, and preventing the numbered itemization detecting section from performing the numbered itemization processing operation.

13. A translation apparatus of claim 9, wherein the numbered itemization detecting section, if the numbers respectively represented by the numeric characters in the leading character strings are not in numerically ascending order, permits a user to determine whether or not the one line should be regarded as being in the numbered itemization format.

14. A translation apparatus of claim 1, wherein the layout analyzing section comprises a labeled itemization detecting section for detecting a labeled itemization format by checking two successive lines in the source document for detection of a predetermined labeled itemization separator and, if the labeled itemization separator is detected in the two successive lines, regarding the two successive lines as being in the labeled itemization format, and performing a labeled itemization processing operation by separating a leading character string having the labeled itemization separator at its end from a text portion in each of the lines with the leading character string being regarded as a labeled itemization header.

15. A translation apparatus of claim 1, wherein the layout analyzing section comprises a labeled itemization detecting section for detecting a labeled itemization format by checking a predetermined number of successive lines in the source document for detection of a labeled itemization separator and, if the labeled itemization separator is detected in the first line and any other line of the successive lines, regarding the lines including the labeled itemization separator as being in the labeled itemization format, and performing a labeled itemization processing operation by separating a leading character string having the labeled itemization separator at its end from a text portion in each of the lines in the labeled itemization format with the leading character string being regarded as a labeled itemization header and regarding a line that follows the first line and does not include the labeled itemization separator is a continuation from the first line.

16. A translation apparatus of claim 14, wherein the layout analyzing section further comprises a labeled itemization exception detecting section for negating the detection of the labeled itemization format if a predetermined labeled itemization exception character string followed by the labeled itemization separator is included in the labeled itemization headers in the lines regarded as being in the labeled itemization format by the labeled itemization detecting section, and preventing the labeled itemization detecting section from performing the labeled itemization processing operation.

17. A translation apparatus of claim 1, wherein the layout analyzing section comprises a separator line detecting section for detecting an independent separator line by sequentially checking characters in a line in the source document and, if the line includes a sequence of identical characters of a number not smaller than a predetermined number, regarding the line as the separator line.

18. A translation apparatus of claim 1, wherein the layout analyzing section comprises a separator line detecting section for detecting an independent separator line by sequentially checking characters in a line in the source document and, if the line includes a sequence of symbols of a number not smaller than a predetermined number, regarding the line as the separator line.

19. A storage medium containing thereon a translation apparatus controlling program, which causes a computer to perform the functions of: causing a layout analyzing section to analyze layout information including cascade information, itemization information, numbered itemization information, labeled itemization information and separator line information in a source document in a natural language inputted by an inputting section and to specify a translation range on the basis of the layout information; causing a translation processor to translate a source document text in the specified translation range into a second language; and causing an outputting section to output a translated text provided by the translation processor.

\* \* \* \* \*